UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

INOCULATED HUMUS AND PROCESS OF MAKING SAME.

1,002,248.      Specification of Letters Patent.      Patented Sept. 5, 1911.

No Drawing.      Application filed June 1, 1911. Serial No. 630,677.

*To all whom it may concern:*

Be it known that I, CARLETON ELLIS, a citizen of the United States, residing at Montclair, in the county of Essex and State of New Jersey, have invented certain new and useful Improvements in Inoculated Humus and Processes of Making Same, of which the following is a specification.

This invention relates to humus material, or peat, having an enhanced or more available nitrogen content, with or without the addition of potash, phosphorus or similar fertilizing material and also relates to the process of making the aforesaid product; all as hereinafter described and claimed.

Ordinary humus, or peat, contains varying quantities of nitrogen, ranging from about 1% to 6%, and various attempts have been made to utilize the nitrogen for fertilizing purposes, inasmuch as nitrogen is the most costly element of a complete fertilizer. The nitrogen in humus or peat, is however so firmly united, that it is liberated very slowly by the processes of oxidation and decay, and so humus nitrogen is not regarded as a very satisfactory source of nitrogenous material. The nitrogen is apparently present in three forms, as amido nitrogen, amino-acid nitrogen and a third form, the nature of which is not definitely known at the present time. It is however, known that the action of alkalis on humus causes the amido and amino-acid nitrogen constituents to be converted into crenates and aprocrenates which are very complex bodies; while the action of the alkalis on the third form of nitrogen causes this form to break down into simpler nitrogenous bodies and even into ammonia.

Humus is a very important element of the soil. It has the advantage of being very porous, so that it is highly absorbent of both water and gases, and serves as a nutrient material for fungus and bacterial growth. The humus substances are gelatinous when moist but are never noticeably plastic or adhesive. Dry humus swells up visibly when wetted, the volume weight increasing from two to eight times, in this respect somewhat resembling glue or gelatin. In its water absorbing capacity, humus stands foremost among the soil constituents. The density of natural humus is about 1.4, hence it is the lightest of all the soil constituents, and if present in a substantial quantity in a soil it greatly improves the lightness and physical condition thereof, converting heavy and non-porous clay soils for example, into tillable ground. Moreover, its functions in the soil are both numerous and important to vegetable growth. As regards soil formation, it assists disintegration of the rock material by the formation of certain fixed soluble acids capable of acting upon the soil quite effectively, which action is enhanced by the slow but continuous evolution of a carbonic acid under the influence of the oxygen of the air. Another very important function is its action on the soil in maintaining tilth, inasmuch as it tends to form the soil into floccules or crumbs, which are extremely desirable and important to plant growth. The several humates present in the soil such as those of lime, magnesia, iron and the like are colloidal when fresh, resembling clay, but unlike the latter, after once being dried they do not resume their plastic form on exposure to moisture. The impregnation of soil with fresh colloidal humates thereby causes the formation of soil crumbs of a very permanent character. As stated, these humus substances serve as nutrient material for the growth of bacteria and it is largely due to the presence of humus that micro-organisms abound in the soil and exercise important functions in connection with the growth of the higher plants. In fact, it has been observed that bacterial content is often directly proportional to humus percentages. Hence the bacterial and humus contents of soil are sensibly, if not directly correlated.

A large proportion of the bacteria of the soil are present in the aerobic form, that is, dependent upon the presence of free oxygen for their growth, while others, known as anerobic bacteria, flourish best in the absence of air, or are able to avail themselves of the presence of combined oxygen by the reduction of oxids present in the soil.

While bacteria are able to thrive upon humus, they are apparently directly nourished by the products of oxidation of humus and the various gums derived from decaying plant substances. Carbohydrates are useful in the propagation of soil bacteria and the salts of organic acids, such as sodium citrate, lactate and malate have been found especially stimulating to their growth.

That bacteria are very important to the growth of plants has been shown by experiments with sterilized soil in which certain essential processes are completely suppressed until the soil is reinfected, and conditions of bacterial life restored. And an acid medium, such as in a "sour" soil, nitrification promptly ceases, as it also does generally when the amount of base present has been fully neutralized.

The bases most favorable to nitrification are lime and magnesium in the form of carbonates, an excess of which does no harm, while in the case of carbonates of potash and soda the amounts must be restricted to certain narrow limits.

Besides the nitrifying bacteria of the soil, namely, nitrosomonas, nitro bacteria and the like, there are present denitrifying bacteria which have an unfavorable action inasmuch as they tend to convert available nitrogen into gaseous nitrogen resulting in the complete loss of such nitrogen to the soil. The action of denitrifying bacteria is very apparent when exerted on such valuable food material as nitrates and nitrites.

It may be added that various neutral salts have an action on nitrification which is not always favorable. ½ of 1% of common salt has been shown to prevent nitrification altogether, while smaller amounts retard the action proportionately. The sulfates of the earthy and alkali groups seem however to act favorably, at least up to ½ of 1% for the more soluble species. Gypsum is especially beneficial, while sodium and potassium sulfate and calcium and magnesium carbonate are usually effective in decreasing strength in the order named, apart from their neutralizing action.

Ammonia-forming bacteria are also present in the soil to some extent, and these are capable of changing albuminoids and humus into ammonia.

Other bacteria of importance in plant growth, especially in the growth of leguminous plants are the nitrogen absorbing bacteria, which grow in and on the nodules of the roots of leguminous plants. Their growth and propagation are also probably favored by the presence of certain green algæ which are often seen to develop on soil surfaces.

The bacteria most important with the present invention are the *Clostridium pasteurianum*, *Bacillus alcaligenes*, *Bacillus tumescens*, *Pseudomona radicicola*, *Granulobacter*, and several species of the *Azotobacter* as *Vinelandeii*, *Chroococcum* and the like.

The present invention has particularly to do with the inoculation of peat, humus, etc., with nitrogen assimilating bacteria and preferably with nitrifying bacteria, and maintenance of such inoculated material in a sufficiently neutral state and its incubation under conditions calculated to increase and improve the content of the nitrogenous elements. That is to say, by the action of nitrifying bacteria under suitable conditions, the relatively unavailable nitrogen of humus may be converted until an assimilable form and by action of certain of the nitrogen absorbing bacteria also under suitable conditions, nitrogen may be taken up from the air by the humus and placed in such a form as to be readily available as a plant food. Therefore, it becomes possible by the present invention not only to convert the 1% to 6% or so of the relatively unavailable nitrogen into available nitrogen, but also to introduce several per cent. of available nitrogenous food by absorption of nitrogen from the air, and subsequent conversion. It has heretofore been proposed to inoculate soils or peat with certain bacteria, but so far as I am aware, it has not been recognized that conditions most favorable for nitrification and nitrogen assimilation could be secured by having the inoculated soil or humus in an initially sterile condition. Not only is it desirable for the purpose of the present invention to have the humus initially in a largely sterile condition, so as to prevent the growth of undesirable bacteria, such as those having to do with denitrification and the like, but it is also fairly essential to have substantially pure cultures of the inoculated bacteria available for the introduction of said humus.

As heretofore indicated, sterilization of the soil, as for example by heat, would not be desirable, generally speaking, as plants grow in such soil very slowly until the latter is properly inoculated. In the present invention, the humus material being free as possible from detrimental saline bodies, is sterilized more or less and is inoculated with certain of the nitrifying or nitrogen absorbing bacteria above mentioned, or others suitable for the purpose. Sterilization of the humus in an autoclave in the presence of moisture at a pressure of two to three atmospheres has the advantage of breaking down certain of the nitrogenous bodies into simpler and more readily available forms and for the purpose of the present invention sterilization may be carried out in this manner, or, inasmuch as a fertilizing material has to be produced on a large scale, the sterilization may be effected by passing the humus material through an ordinary rotary drier, using for example any of the well known types of driers, preferably those however, drying by indirect heat. Sterilization by heat takes place most effectively in the presence of moisture, and inasmuch as a rotary drier expels the major proportion of the moisture in the earlier stages of drying, I prefer to inject steam or water vapor in regulated amounts into such a drier at a point near its discharge end, thereby completing the sterilization in a rapid and efficient manner. I may also effect sterilization, or substantial sterilization by the use of an antiseptic material. Such material must however, be of a character that will not affect the growth of the bacteria which are subsequently introduced into the humus. It also must be inexpensive. In other words, an antiseptic or bactericide is required which has a selective sterilizing action, destroying or repressing the growth of unfavorable bacteria, etc., and permitting the growth of nitrogen yielding bacteria. A material of this description is found in lime borax waste, a by-product in the refining of crude borax ores. The borax waste is available chiefly in the form of borax-containing sulfate and carbonate of lime, both of which materials have a stimulating action on the growth of beneficial bacteria. The antiseptic base resides in a small content of borate which is not extracted in the process of treating the ore. From 5% to 8% of the lime borax waste usually suffices to bring about the desired condition of selective sterility.

As a neutralizing material, in addition to the borax waste, (or in case sterilization has been effected by heat and a neutralizing material is required,) basic slag is well adapted. This is also known as Thomas phosphate powder, and is obtained in the manufacture of steel by the basic process. It contains phosphorus in the form of tetracalcium phosphate. An analysis of such a basic slag shows about 19% of the total phosphoric acid, 16% of available phosphoric acid, 3% of insoluble phosphoric acid, 40% lime, 5% magnesia, 13% iron oxid and 7% manganese oxid. A large proportion of the lime is present in the form of the oxid, and serves as a valuable neutralizing agent for the acids of the peat. In introducing the basic slag, or other neutralizing materials, into the humus, I may effect the entry prior to sterilization by heat, or in case the latter method is not adopted for sterilization, the basic slag may be simply mixed with borax waste or other antiseptic to be employed for cold sterilization. 3% to 5% of such basic slag may be introduced for this purpose. To further assist in the speed of incubation, I also prefer to add small quantities of saccharine matter such as glucose, molasses, or blackstrap. The addition of organic salt, such as sodium citrate, are also useful as above indicated. In citrus fruit producing regions, large quantities of waste fruit or culls are obtainable, and these may be pulped and the juices neutralized with carbonate of soda or milk of lime and the like, to form a cheap stimulating material. In Florida, for example, where immense deposits of peat are found, these culls are readily obtainable and in that section they may therefore be used without materially increasing the cost of manufacture.

In carrying out my invention, peat is secured running as high as possible in nitrogen and should the peat contain large quantities of water, pressure may be resorted to in order to remove a considerable portion of the moisture. If roots are present, the product may be screened or ground to make it granular in character. The mixture may then be mixed with 3% to 8% of borax waste and incubated, or it may be sterilized by heat, as by heating in an autoclave to 2 or 3 atmospheres, or by passing through a rotary drier, preferably exposed to a current of steam. The heat-sterilized material may then be treated with 3% to 5% of basic slag, or lime borax waste and moistened with an inoculating solution of nitrogen assimilating bacteria, such as those above mentioned. The components are well mixed or composted and exposed to air away from rain in order to bring about the proper formation of bacteria and the conversion of the nitrogen; or the material, after having been inoculated may be placed in an incubator as for example a large chamber maintained at a temperature of 25 to 30 degrees C. and charged with moisture, through which the humus product is allowed to slowly travel. This may be effected very simply by means of an extensive series of belt conveyers, arranged horizontally, and superposed one on the other, so that the material falls from one conveyer to another until it has received the necessary exposure to air, moisture and warmth and nitrogen has been absorbed to a desired amount.

The addition of small amount of nitrogenous salts such as ammonium sulfate and phosphate, or of potash salts, or potash-containing bodies, such as vinasse, are sometimes required to effect rapid conversion, all depending upon the character of the original peat.

By the use of basic slag and potash salts a complete fertilizer may be secured, or after the treatment of the humus to render its initial nitrogen assimilable and also to increase the nitrogen content, other fertilizing material may be added, such as additional basic slag, superphosphate, double superphosphate, bone meal, sulphate and chlorid of potash and the like.

The flora and fauna of peat are highly complex; often containing many molds, algæ, protozoa, as vorticella (*Vorticella putrina*, etc.), monads, (*Euglena* and the like,) amoebæ, ciliates, flagellates, etc., hence in some cases, partial or selective sterilization cannot be quickly effected except by the use of some volatile sterilizer, preferably in conjunction with the lime borax waste. The addition of $\frac{2}{10}$ or $\frac{3}{10}$ of a per cent of benzene, toluene, naphthalene, wood tar oils and distillates, Russian turpentine, carbon bisulfid and the like, serves to greatly reduce the bacteria feeding organisms and permit of the rapid growth of useful bacteria.

Various types of peat or humus sometimes require different conditions of handling, and it is difficult, *à priori*, to give precise directions for the method of neutralization of any particular species of peat. Nitrifying bacteria, for example, will not flourish when in certain kinds of peat where carbonate of lime is present in excess of 2%, although from the foregoing it will be seen that I have recommended from 3% to 8% or so of calcareous material. Since however, conditions demand special forms of neutralizing material in certain cases and since potash and phosphorus salts are materials of value in stimulating the growth of nitrifying or nitrogen assimilating bacteria and symbiotic bacteria, especially if said salts are not in a soluble form, but in an available form, various useful mixtures may be prepared by roasting apatite or calcium phosphate with feldspar, potassium silicate, lime, silica and similar materials. For this purpose, a rotary kiln, such as employed in cement manufacture may be used, and the materials may simply be sintered together, or they may be produced in a fused condition and disintegrated by means of a jet of steam or air. Mixtures may be made from 100 parts of apatite, 2 parts of calcium chlorid, 27 parts of feldspar and 20 parts of silica. Or simply, from 100 parts of apatite, or phosphate rock and 50 parts of silica, which produce a silico-phosphate. This reaction is carried out better in the presence of lime, and 100 parts of apatite, 50 parts of silica and 30 parts of lime roasted at about 1400 C. give a satisfactory composition. Other mixtures are, 100 parts of apatite, 1 part calcium chlorid, 40 parts feldspar and 1 part each sodium chlorid, and sodium sulfate. Also 100 parts calcium phosphate, 25 parts potassium silicate and 30 parts quicklime. Also 100 parts calcium phosphate, 30 parts feldspar and 20 parts potassium silicate.

As previously stated, nitrogenous matter is sometimes required to start active nitrification and the growth of nitrogen assimilating bacteria, hence the addition of ammonium sulfate or albuminoid ammonia as a nutrient addition.

The procedure, as above given illustratively, of course does not need to be followed exactly, as variations in the several stages or steps are possible, as will now be evident to those skilled in the art; and I do not wish to limit myself to the precise materials or methods of procedure as set forth above.

What I claim is,

1. The process of treating humus, comprising mixing humus material with lime material containing basic slag, sterilizing said humus material and inoculating it with nitrogen assimilating bacteria.

2. The process of treating humus, comprising mixing humus material with basic slag, and inoculating said humus material with soil bacteria.

3. The process of treating humus, comprising mixing humus material with basic slag, substantially sterilizing said humus material by the addition of borax waste and inoculating said material with nitrogen assimilating bacteria.

4. The process of treating humus, which comprises mixing substantially sterile humus material with basic slag, inoculating said humus material with bacteria and incubating the mixture.

5. The process of treating humus, which comprises mixing substantially sterile humus material with basic slag and stimulating material, inoculating said humus material with bacteria and incubating the mixture.

6. The process of treating humus, which comprises mixing substantially sterile humus material with basic slag, borax waste and saccharine material, inoculating said humus material with bacteria and incubating it in the presence of air and moisture.

7. In the process of treating humus to increase its nitrogen content, the procedure which consists in incubating a substantially sterilized mixture, comprising humus, calcareous material containing phosphates and borates, and nitrogen assimilating bacteria.

8. A humus product comprising peat, having its natural nitrogen substantially in a readily available form and containing available nitrogen derived from the air by the action of nitrogen assimilating bacteria, said product also containing calcareous material.

9. A humus product comprising peat substantially freed of its originally-present micro-organisms, having its natural nitrogen in a readily available form and containing available nitrogen derived from the air by the action of nitrogen-assimilating bacteria.

10. A humus product comprising peat substantially freed of its originally-present micro-organisms, having its natural nitrogen in substantially a readily available form and containing available nitrogen derived from the air by the action of nitrogen-assimilating bacteria.

11. A humus product comprising peat substantially freed of its originally-present micro-organisms, having its natural nitrogen in substantially a readily available form and containing available nitrogen derived from the air by the action of nitrogen-assimilating micro-organisms; said product also containing calcareous material and phosphates.

In testimony whereof I have affixed my signature in the presence of two witnesses.

CARLETON ELLIS.

Witnesses:
. BIRDELLA M. ELLIS,
MARY E. ROCHE.